(12) United States Patent
Wang et al.

(10) Patent No.: US 11,602,180 B2
(45) Date of Patent: Mar. 14, 2023

(54) HUMAN BODY SIMULATION MODEL, FITTING DEVICE, FITTING SERVER AND CONTROL METHOD

(71) Applicants: Hefei BOE Optoelectronics Technology Co., Ltd., Anhui (CN); BOE Technology Group Co., Ltd., Beijing (CN)

(72) Inventors: Chuanyan Wang, Beijing (CN); Kun Yu, Beijing (CN)

(73) Assignees: HEFEI BOE OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 232 days.

(21) Appl. No.: 16/986,442

(22) Filed: Aug. 6, 2020

(65) Prior Publication Data
US 2021/0045463 A1 Feb. 18, 2021

(30) Foreign Application Priority Data

Aug. 15, 2019 (CN) .......................... 201910754762.3

(51) Int. Cl.
*A41D 1/00* (2018.01)
*A41D 27/08* (2006.01)
(Continued)

(52) U.S. Cl.
CPC ........... *A41D 1/002* (2013.01); *A41D 27/085* (2013.01); *G01L 5/0028* (2013.01);
(Continued)

(58) Field of Classification Search
CPC .. A41D 1/002; A41D 27/085; A41D 2400/38; G01L 5/0028; G01L 5/0052;
(Continued)

(56) References Cited

U.S. PATENT DOCUMENTS

| | | | |
|---|---|---|---|
| 9,498,011 B2 | 11/2016 | Chan et al. | |
| 2011/0262683 A1* | 10/2011 | Mochizuki | C08L 35/06 264/13 |

(Continued)

FOREIGN PATENT DOCUMENTS

| | | |
|---|---|---|
| CN | 102365043 A | 2/2012 |
| CN | 103260447 A | 8/2013 |

(Continued)

OTHER PUBLICATIONS

Chan et al., "Mechanical and Clinical Evaluation of a Shape Memory Alloy and Conventional Struts in a Flexible Scoliotic Brace", Apr. 24, 2018, BMES (Year: 2018).*

(Continued)

*Primary Examiner* — YuJang Tswei
(74) *Attorney, Agent, or Firm* — Westman, Champlin & Koehler, P.A.

(57) ABSTRACT

The present disclosure discloses a human body simulation model, a fitting device, a fitting server, and a control method. The human body simulation model includes: a human body model; a photodeformable shaping garment; a plurality of excitation light sources; a plurality of elastic elements; and a first controller configured to control at least a part of the plurality of excitation light sources to emit light waves to the photodeformable shaping garment according to body shape parameters of a user received, so that the photodeformable shaping garment is deformed to simulate a body shape of the user.

13 Claims, 5 Drawing Sheets

(51) Int. Cl.
  *G01L 5/00* (2006.01)
  *G06Q 30/06* (2012.01)
  *G06T 19/20* (2011.01)
  *A41H 5/01* (2006.01)
  *A41H 5/00* (2006.01)
  *G06Q 30/0601* (2023.01)

(52) U.S. Cl.
  CPC ......... *G06Q 30/0643* (2013.01); *G06T 19/20* (2013.01); *A41D 2400/38* (2013.01); *A41H 5/00* (2013.01); *A41H 5/01* (2013.01); *G01L 5/00* (2013.01); *G01L 5/0052* (2013.01); *G06T 2219/2021* (2013.01)

(58) Field of Classification Search
  CPC ....... G01L 5/00; G06Q 30/0643; G06T 19/20; G06T 2219/2021; A41H 5/01; A41H 5/00
  See application file for complete search history.

(56) References Cited

U.S. PATENT DOCUMENTS

| | | | |
|---|---|---|---|
| 2012/0284148 | A1 | 11/2012 | Volchek |
| 2013/0238285 | A1 | 9/2013 | Volchek |
| 2014/0180181 | A1* | 6/2014 | von Oepen ........ A61H 23/0236 601/47 |
| 2015/0134494 | A1* | 5/2015 | Su ........................... G06F 30/20 705/27.2 |
| 2015/0189937 | A1 | 7/2015 | Chan et al. |
| 2016/0275724 | A1* | 9/2016 | Adeyoola .......... G06Q 30/0643 |
| 2018/0001184 | A1* | 1/2018 | Tran .................... G09B 19/0038 |
| 2018/0035828 | A1 | 2/2018 | Kruusmaa et al. |
| 2019/0247650 | A1* | 8/2019 | Tran ..................... A61N 1/3704 |
| 2019/0361917 | A1* | 11/2019 | Tran ..................... G06Q 20/308 |

FOREIGN PATENT DOCUMENTS

| | | |
|---|---|---|
| CN | 103564899 A | 2/2014 |
| CN | 103810607 A | 5/2014 |
| CN | 104392063 A | 3/2015 |
| CN | 108897242 A | 11/2018 |
| JP | 2000279295 A | 10/2000 |

OTHER PUBLICATIONS

English translation of Qing, X. et al., "Photodeformable Liquid Crystal Polymers", Journal, Department of Materials Science, doi: 10.11777 /j.issnl 000-3304.2017.17196, dated Nov. 30, 2017, 36 pages.

First Office Action, including Search Report, for Chinese Patent Application No. 201910754762.3, dated Jun. 1, 2021, 18 pages.

Qing, X. et al., "Photodeformable Liquid Crystal Polymers", Journal, Department of Materials Science, doi: 10.11777 /j.issnl 000-3304.2017.17196, dated Nov. 30, 2017, 27 pages.

* cited by examiner

HUMAN BODY SIMULATION MODEL, FITTING DEVICE, FITTING SERVER AND CONTROL METHOD

CROSS-REFERENCE TO RELATED APPLICATION(S)

This application claims priority to the Chinese Patent Application No. 201910754762.3, filed on Aug. 15, 2019, which is incorporated herein by reference in its entirety.

TECHNICAL FIELD

The disclosure relates to the field of photodeformation technology, and more particularly, to a human body simulation model, a fitting device, a fitting server and a control method.

BACKGROUND

At present, internet communication is increasing developed, and many people do shopping online, but when buying clothes online, they often encounter situations where sizes of the clothes may not be determined. As a result, the clothes being purchased are not satisfactory and are required to be mailed repeatedly. Sometimes when buying some expensive clothes, due to the consideration of sizes and wearing comfort, it is often necessary to firstly try on the clothes in a hypostatic store and then to buy the clothes online, which is time-consuming and laborious. In addition, when people gather in a hypostatic store to buy clothes during holidays, they often encounter a problem of waiting for a fitting room, which is a waste of time and also affects a shopping mood. When people need to buy clothes for others, they may also encounter above problem.

SUMMARY

A first aspect of the present disclosure provides a human body simulation model, comprising:
a human body model;
a photodeformable shaping garment disposed on the human body model;
a plurality of excitation light sources distributed on the human body model, and configured to emit light waves to the photodeformable shaping garment;
a plurality of elastic elements distributed on a side of the human body model facing the photodeformable shaping garment, and configured to be adaptively deformed in response to pressure generated due to deformation of the photodeformable shaping garment to support the photodeformable shaping garment; and
a first controller connected to the plurality of excitation light sources, and configured to receive body shape parameters of a user and control at least a part of the plurality of excitation light sources to emit light waves to the photodeformable shaping garment according to the body shape parameters of the user, so that the photodeformable shaping garment is deformed to simulate a body shape of the user.

According to an embodiment, the human body simulation model further comprises:
a plurality of pressure sensors distributed on the photodeformable shaping garment, disposed on a side of the photodeformable shaping garment away from the human body model, and configured to sense pressure of try-on clothes worn on the human body simulation model onto the human body simulation model and output pressure signals; and
a second controller configured to generate pressure information for display according to the pressure signals output by the plurality of pressure sensors.

According to an embodiment, the human body simulation model further comprises a display panel connected to the first controller and the second controller, and configured to display the body shape parameters of the user under control of the first controller and display the pressure information under control of the second controller.

According to an embodiment, the plurality of excitation light sources and the plurality of elastic elements are evenly distributed on predetermined parts of the human body model; and
the plurality of pressure sensors are evenly distributed in a predetermined area of the photodeformable shaping garment, wherein the predetermined area covers the predetermined parts of the human body model.

According to an embodiment, a material of the photodeformable shaping garment is a liquid crystal polymer comprising azobenzene units.

According to an embodiment, the photodeformable shaping garment has a thickness more than 0.1 mm and less than 2 mm.

According to an embodiment, the elastic elements are compression springs.

According to an embodiment, the excitation light sources are solid ultraviolet lasers, gas ultraviolet lasers or semiconductor laser diodes.

According to an embodiment, the body shape parameters of the user comprise at least one of a shoulders width, a chest circumference, a waist circumference, a buttocks circumference, a sleeve length, a pants length, or a crotch length of the user.

According to an embodiment, the predetermined parts comprise at least one of a chest, shoulders, a waist, or buttocks.

A second aspect of the present disclosure provides a fitting device, comprising:
a human body simulation model according to the first aspect; and
a processor configured to receive body shape parameters of a user and transmit the body shape parameters of the user to the human body simulation model, so that a first controller of the human body simulation model controls at least a part of a plurality of excitation light sources to emit light waves to a photodeformable shaping garment according to the body shape parameters of the user, so that the photodeformable shaping garment is deformed to simulate a body shape of the user.

A third aspect of the present disclosure provides a fitting server, comprising:
a memory having instructions stored therein; and
a processor configured to execute the instructions to receive body shape parameters of a user, select a human body simulation model matching the body shape parameters of the user from a plurality of human body simulation models according to the body shape parameters of the user, and transmit the body shape parameters of the user to a selected human body simulation model,
wherein the human body simulation model comprises:
a human body model;
a photodeformable shaping garment disposed on the human body model;

a plurality of excitation light sources distributed on the human body model, and configured to emit light waves to the photodeformable shaping garment;

a plurality of elastic elements distributed on a side of the human body model facing the photodeformable shaping garment, and configured to be adaptively deformed in response to pressure generated due to deformation of the photodeformable shaping garment to support the photodeformable shaping garment; and a first controller connected to the plurality of excitation light sources, and configured to receive the body shape parameters of the user and control at least a part of the plurality of excitation light sources to emit light waves to the photodeformable shaping garment according to the body shape parameters of the user, so that the photodeformable shaping garment is deformed to simulate a body shape of the user.

A fourth aspect of the present disclosure provides a control method of the human body simulation model according to the first aspect, comprising:

receiving, by a first controller of the human body simulation model, body shape parameters of a user and controlling at least a part of a plurality of excitation light sources to emit light waves to a photodeformable shaping garment according to the body shape parameters of the user; and causing the photodeformable shaping garment of the human body simulation model to be deformed according to emitted light waves to simulate a body shape of the user, so as to simulate a try-on effect of try-on clothes worn on the human body simulation model.

According to an embodiment, the method further comprises:

sensing, by a plurality of pressure sensors of the human body simulation model, pressure of the try-on clothes worn on the human body simulation model onto the human body simulation model and outputting pressure signals; and generating, by a second controller of the human body simulation model, pressure information for display according to the pressure signals output by the plurality of pressure sensors.

A fifth aspect of the present disclosure provides a control method of the fitting server according to the third aspect, comprising:

receiving body shape parameters of a user;

selecting a human body simulation model matching the body shape parameters of the user from a plurality of human body simulation models according to the body shape parameters of the user;

transmitting the body shape parameters of the user to a selected human body simulation model, so that a first controller of the selected human body simulation model controls at least a part of a plurality of excitation light sources to emit light waves to a photodeformable shaping garment according to the body shape parameters of the user, and the photodeformable shaping garment of the selected human body simulation model is deformed according to emitted light waves and simulates a body shape of the user to simulate a try-on effect of try-on clothes worn on the human body simulation model.

BRIEF DESCRIPTION OF THE ACCOMPANYING DRAWINGS

The specific embodiments of the present disclosure will be described below further in detail in conjunction with the accompanying drawings.

DETAILED DESCRIPTION

In order to explain the present disclosure more clearly, the present disclosure will be further described below in conjunction with preferred embodiments and the accompanying drawings. Similar elements in the accompanying drawings are denoted by the same reference signs. It should be understood by those skilled in the art that content described below is illustrative rather than restrictive, and should not be used to limit the protection scope of the present disclosure.

Figure 1:
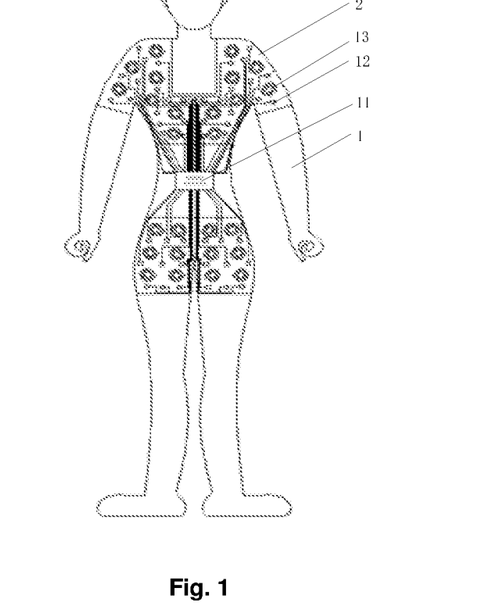
FIG. 1 illustrates a schematic structural diagram of a human body simulation model according to an embodiment of the present disclosure.

As illustrated in FIG. 1, an embodiment of the present disclosure provides a human body simulation model. The human body simulation model comprises a human body model 1 and a photodeformable shaping garment 2 disposed on the human body model 1. The human body simulation model further comprises a plurality of excitation light sources 12 distributed on the human body model 1, and the plurality of excitation light sources 12 are configured to emit light waves to the photodeformable shaping garment 2. The human body simulation model further comprises a plurality of elastic elements 13, which are distributed on a side of the human body model 1 facing the photodeformable shaping garment 2. The plurality of elastic elements 13 are configured to be adaptively deformed in response to pressure applied on the human body model 1 due to deformation of the photodeformable shaping garment 2 to support the photodeformable shaping garment 2. The human body simulation model further comprises a first controller 11 connected to the plurality of excitation light sources 12 and configured to receive body shape parameters of a user and control at least a part of the plurality of excitation light sources 12 to emit light waves to the photodeformable shaping garment 2 according to the body shape parameters of the user, so that the photodeformable shaping garment 2 is deformed to simulate a body shape of the user.

In a specific example, as illustrated in FIG. 1, the photodeformable shaping garment 2 is made of a photodeformable material. Under irradiation of light waves (for example, infrared light, ultraviolet light) emitted from light sources which are greater than a deformation threshold, a shape of the material itself is changed, for example, bent, or stretched. Most photodeformable materials have memory characteristics, that is, after being deformed by light irradiation, the photodeformable materials may recover to their original states when the light sources are turned off. The deformation threshold is related to the photodeformable material used, and those skilled in the art may select appropriate excitation light sources and deformation threshold according to the photodeformable material used, which will not be repeated here.

In this embodiment, the human body model 1 is a universal humanoid dressing model, and the photodeformable shaping garment 2 is directly worn on the human body model 1. The photodeformable shaping garment 2 comprises a coat and pants with a thickness more than 0.1 mm and less than 2 mm, and the photodeformable material used is a liquid crystal polymer comprising azobenzene units. The plurality of excitation light sources 12 are ultraviolet lasers. The photodeformable shaping garment 2 may be deformed under the irradiation of the ultraviolet lasers.

The controller 11 comprises a control unit and a communication unit. The controller 11 receives the body shape parameters of the user transmitted by an external device through the communication unit. For example, the user inputs his/her own body shape parameters through application software running on the external device such as a computer, a smart phone, a tablet, and a smart TV. The body shape parameters of the user are, for example, specific sizes such as a chest circumference, a waist circumference, a buttocks circumference, a shoulders width, a sleeve length, a pants length, and a crotch length of the user. The user may transmit his/her body shape parameters to the communication unit of the controller 11 by operating the external device. The control unit of the controller 11 calculates intensity of light required to be emitted by the plurality of excitation light sources 12 according to received body shape parameters of the user and controls at least a part of the plurality of excitation light sources 12 to emit light waves, so that the photodeformable shaping garment 2 is deformed such as retracted, stretched and bent. For example, if the waist circumference of the user has a size of 2.2 feet, on the basis of an existing size of the waist circumference of the photodeformable shaping garment 2, it is determined through calculation that whether the photodeformable shaping garment 2 needs to be retracted, stretched or bent, and the excitation light sources 12 at respective positions are controlled to emit light waves according to a result of the calculation. In this embodiment, the plurality of excitation light sources 12 are ultraviolet lasers, for example, one of a solid ultraviolet laser, a gas ultraviolet laser, or a semiconductor laser diode.

The plurality of elastic elements 13 are elastic elements with a certain adaptive elastic deformation function according to an external space, and may play a supporting role. In this embodiment, the plurality of elastic elements 13 are springs, which may produce compressive deformation according to an external force received, and therefore are also referred as compression springs. When the photodeformable shaping garment 2 is worn on the humanoid dressing model, the springs may produce adaptive elastic deformation according to a specific size of the photodeformable shaping garment 2 to support the photodeformable shaping garment 2. That is, the human body simulation model may form a customized human body model which may simulate the body shape of the user according to the body shape parameters of the user. When clothes to be tried on is worn on the customized human body model, it may simulate a situation where the user tries on the clothes, and a try-on effect may be intuitively seen. The human body simulation model according to the embodiment of the present disclosure simulates body shapes of different users to solve the problem that it is impossible to try on clothes during online shopping. The human body simulation model has a wide range of application prospects and is suitable for application scenarios such as online shopping, buying clothes for others, or selecting clothes in a hypostatic store without a fitting room.

It should be understood that this embodiment is only used to explain a solution of the present application, a position of the first controller 11 in FIG. 1 is only used for an exemplary description, and those skilled in the art should arrange the position of the first controller 11 according to practical application requirements, which will not be repeated here.

Figure 2A:
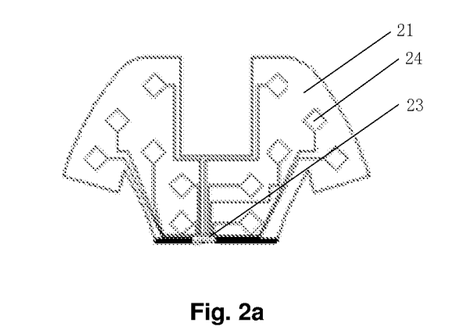
FIGS. 2a-2b illustrate schematic structural diagrams of a photodeformable shaping garment according to an embodiment of the present disclosure.
Figure 2B:
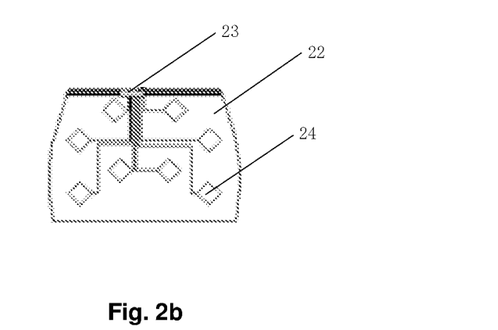

In consideration that it is more convincing to show the try-on effect intuitively through numbers, in an alternative embodiment, as illustrated in FIGS. 2a and 2b, the human body simulation model further comprises a second controller 23 and a plurality of pressure sensors 24 distributed on the photodeformable shaping garment 2. Here, the pressure sensors 24 are disposed on a side of the photodeformable shaping garment 2 away from the human body model 1, and are used to sense pressure of a try-on clothes worn on the photodeformable shaping garment 2 onto the human body simulation model and output pressure signals to the second controller 23. The second controller 23 is used to perform data processing on the pressure signals, and generate pressure information for display according to the pressure signals.

FIG. 2a illustrates a schematic structural diagram of a photodeformable coat 21, and FIG. 2b illustrates a schematic structural diagram of photodeformable pants 22. As illustrated in FIGS. 2a and 2b, a second controller 23 and pressure sensors 24 are provided on the photodeformable coat 21 and the photodeformable pants 22 respectively. After the try-on clothes are worn on the human body simulation model, and the photodeformable coat 21 is deformed according to the body shape parameters of the user, the pressure sensors 24 are used to sense pressure of the try-on clothes onto the human body simulation model. For example, if shoulders of the try-on clothes are narrow, pressure sensors 24 located at the shoulders of the photodeformable coat 21 may sense pressure applied by the try-on clothes onto the shoulders of the photodeformable coat 21 and output pressure signals to the second controller 23. The second controller 23 comprises a control unit and a communication unit. The control unit receives the pressure signals and performs data processing on the pressure signals, and transmits a result of the data processing to an external device through the communication unit, so that the external device may obtain a try-on effect and a tightness degree of the try-on clothes more intuitively and clearly according to received pressure signals, and provide the user with a more detailed try-on report, which may further facilitate the user to select suitable clothes. In this embodiment, the control unit generates pressure information, such as a specific pressure value, according to received pressure signals, and compares the specific pressure value with a pressure threshold range preset in the control unit. If the pressure value is within the pressure threshold range, it indicates that the try-on clothes fit well. If the pressure value is greater than a maximum pressure threshold in the pressure threshold range, it indicates that the try-on clothes are tight, and the clothes should be replaced with clothes in a larger size. If the pressure value is less than a minimum pressure threshold in the pressure threshold range, or the pressure value is close to 0, it indicates that the try-on clothes are loose, and it may be considered to replace the clothes with clothes in a smaller size. It should be illustrated that different positions of the same clothes may correspond to different pressure threshold ranges, and clothes with different materials or different styles also correspond to different pressure threshold ranges. Those skilled in the art should be able to select an appropriate pressure range according to practical applications, which will not be repeated here.

At the same time, the photodeformable shaping garment 2 may further comprise a zipper structure, a buckle structure, etc., to further meet practical requirements. For example, when try-on for a thick coat is simulated, it needs to consider other clothes worn under the thick coat, which will not be repeated here.

In consideration that the body shape parameters of the user are concentrated on specific parts such as a chest, a waist, buttocks, and shoulders, and a cost and complexity of arranging the excitation light sources and the elastic elements on the human body simulation model, in an alternative embodiment, the plurality of excitation light sources 12 and the plurality of elastic elements 13 are evenly distributed on predetermined parts of the human body model 1, and the plurality of pressure sensors 24 are evenly distributed at positions corresponding to the predetermined parts in a predetermined area of the photodeformable shaping garment 2 which covers the predetermined parts of the human body model 1. Here, the predetermined parts may be specific parts such as shoulders, a chest, a waist or buttocks, which are closely related to the body shape parameters of the user and choices of clothes. The body shape of the user may further be simulated by using body shape parameters of the predetermined parts. At the same time, in order to better simulate the body shape of the user, the excitation light sources and the elastic elements are evenly distributed on the predetermined parts of the human body model 1, and the pressure sensors are evenly distributed at positions corresponding to the predetermined parts on the photodeformable shaping garment 2 to sense pressure generated by the try-on clothes onto the predetermined parts.

In order to further facilitate users such as buyers or sellers to clearly know a current user corresponding to the human body simulation model, in another alternative embodiment, the human body model further comprises a display panel for displaying the body shape parameters of the user or information of the pressure signals, or both the body shape parameters of the user and information of the pressure signals. That is, the human body model 1 displays user information comprising, for example, the body shape parameters of the user. In addition, the user information may further comprise a network identity (ID) of the user and the like. The second controller 23 on the photodeformable shaping garment 2 may further transmit the pressure signals to the human body model 1, so that a current try-on situation for the try-on clothes on the human body simulation model is displayed on the display panel of the human body model 1, which may be convenient for sellers to display the try-on situation to buyers. In addition, the current user information and the current try-on situation corresponding to the human body simulation model may be displayed at the same time, that is, the body shape parameters of the user and the pressure information are displayed for the sellers and the buyers' reference.

Figure 3:
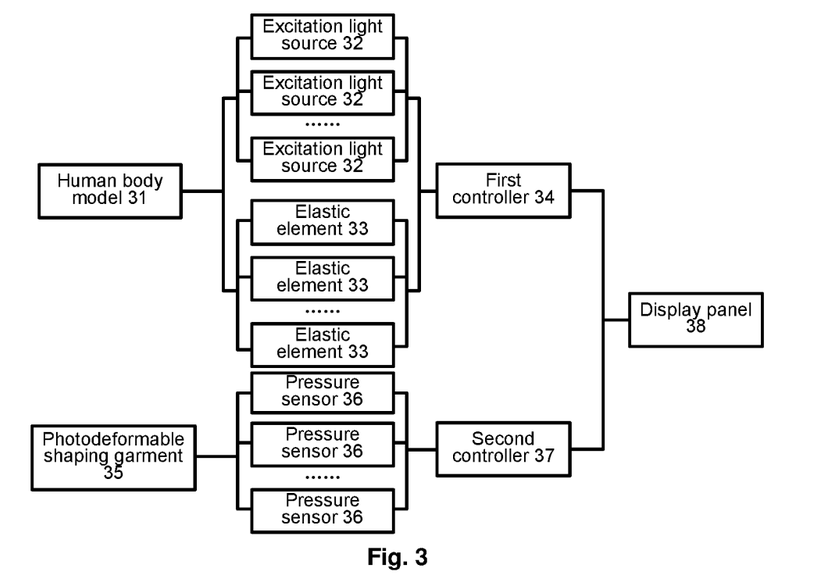
FIG. 3 illustrates a structural block diagram of a human body simulation model according to an embodiment of the present disclosure.

FIG. 3 illustrates a structural block diagram of a human body simulation model according to above embodiment. As illustrated in FIG. 3, a human body model 31 is connected to a plurality of excitation light sources 32 and a plurality of elastic elements 33 both, and the plurality of excitation light sources 32 are connected to a first controller 34. The plurality of excitation light sources 32 may emit light waves to a photodeformable shaping garment 35. The plurality of elastic elements 33 may be adaptively deformed in response to pressure applied on the human body model 31 due to deformation of the photodeformable shaping garment 35 to support the photodeformable shaping garment 35. The first controller 34 may receive body shape parameters of a user, and control at least a part of the plurality of excitation light sources 32 to emit light waves to the photodeformable shaping garment 35 according to the body shape parameters of the user. The photodeformable shaping garment 35 is connected to a plurality of pressure sensors 36, and each of the plurality of pressure sensors 36 is connected to a second controller 37. The photodeformable shaping garment 35 may be deformed under irradiation of the light waves to simulate a body shape of the user. The plurality of pressure sensors 36 may sense pressure of try-on clothes worn on the human body simulation model onto the human body simulation model and transmit pressure signals to the second controller 37. The second controller 37 may generate pressure information according to the pressure signals output by the plurality of pressure sensors 36. The first controller 34 and the second controller 37 are both connected to a display panel 38. The first controller may transmit received body shape parameters of the user to the display panel 38, and the second controller 37 may transmit received pressure information to the display panel 38. The display panel 38 may display the body shape parameters of the user under control of the first controller 34, and display the pressure information under control of the second controller 37.

Figure 4:
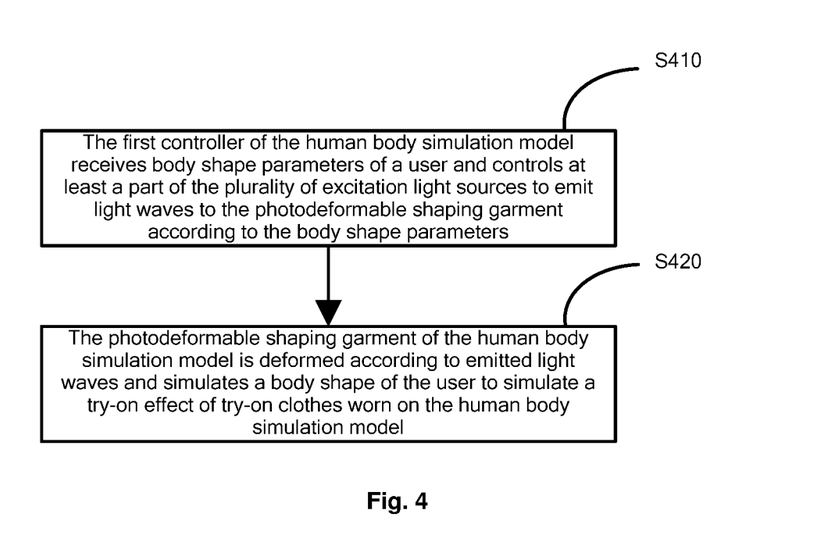
FIG. 4 illustrates a flowchart of a control method according to an embodiment of the present disclosure.

The embodiments of the present application further provide a control method of the human body simulation model described above, which will be described in conjunction with FIG. 4 below. FIG. 4 illustrates a flowchart of the control method according to an embodiment of the present disclosure. The human body simulation model adopted in this embodiment of the present application may be any of the human body simulation models in above embodiments, and therefore will not be described in detail.

As illustrated in FIG. 4, the control method of the human body simulation model described above comprises the following steps.

In step S410, the first controller of the human body simulation model receives body shape parameters of a user and controls at least a part of the plurality of excitation light sources to emit light waves to the photodeformable shaping garment according to the body shape parameters.

In step S420, the photodeformable shaping garment of the human body simulation model is deformed according to emitted light waves and simulates a body shape of the user to simulate a try-on effect of try-on clothes worn on the human body simulation model.

Specifically, the try-on clothes is worn on the human body simulation model. Then, the body shape parameters of the user are transmitted to the human body simulation model, and the human body simulation model receives the body shape parameters of the user and simulates an actual body shape of the user according to the body shape parameters of the user. That is, the plurality of excitation light sources disposed on the human body model emit light waves to the photodeformable shaping garment, so that the photodeformable shaping garment is deformed to simulate the body shape of the user, thereby simulating a try-on condition of the try-on clothes worn on the human body simulation model.

According to an embodiment, the control method further comprises: the pressure sensors of the human body simulation model senses pressure of the try-on clothes worn on the human body simulation model onto the human body simulation model and outputs pressure signals, and the second controller of the human body simulation model generates pressure information for display according to the pressure signals output by the plurality of pressure sensors. That is, the pressure sensors are disposed on the photodeformable shaping garment to sense the pressure of the try-on clothes onto the human body simulation model, so as to further demonstrate a try-on effect and a tightness degree of the try-on clothes.

In another alternative embodiment, the display panel included in the human body simulation model may be used for display, and the control method further comprises: the body shape parameters of the user or the pressure information are displayed, or the body shape parameters of the user and the pressure information are simultaneously displayed. That is, the current user's information and the current try-on condition corresponding to the human body simulation model are displayed through the display panel.

Figure 5:
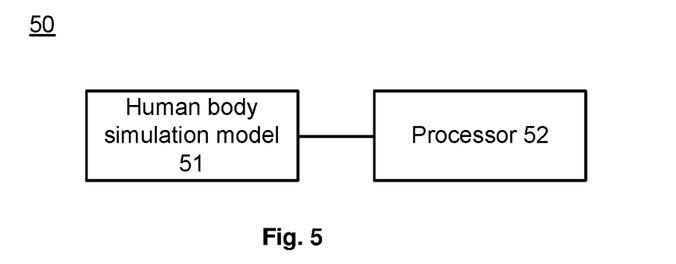
FIG. 5 illustrates a structural block diagram of a fitting device according to an embodiment of the present disclosure.

The embodiments of the present application further provide a fitting device comprising the human body simulation model described above. FIG. 5 illustrates a structural block diagram of the fitting device according to an embodiment of the present disclosure. As illustrated in FIG. 5, the fitting device 50 comprises the human body simulation model 51 described above and a processor 52. The processor 52 is configured to receive body shape parameters of a user, and transmit received body shape parameters of the user to the human body simulation model 51, so that the first controller of the human body simulation model 51 controls at least a part of the plurality of excitation light sources to emit light waves to the photodeformable shaping garment according to the body shape parameters of the user, so that the photodeformable shaping garment is deformed to simulate a body shape of the user. Here, the processor 52 may be an external device such as a smart phone, a tablet, a computer, a smart TV, etc. A buyer or a seller inputs the body shape parameters of the user through application software or a client program running on the external device, so that the human body simulation model 51 emits light waves through the plurality of excitation light sources. Thereby, the photodeformable shaping garment to be deformed to simulate the body shape of the user, so as to simulate a try-on effect of try-on clothes to be tried by the user which is worn on the human body simulation model 51.

Figure 6:
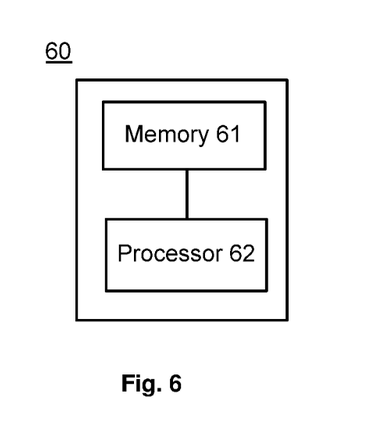
FIG. 6 illustrates a structural block diagram of a fitting server according to an embodiment of the present disclosure.

In consideration that the elastic elements of the human body simulation model are adaptively elastically deformed within a certain range, and different users may be quite different since the users may be high, short, fat, or thin, the embodiments of the present application further provide a fitting server. FIG. 6 illustrates a structural block diagram of the fitting server according to an embodiment of the present disclosure. As illustrated in FIG. 6, the fitting server 60 comprises a memory 61 and a processor 62. Here, the processor 62 is configured to, in response to receiving body shape parameters of a user, select a human body simulation model matching the body shape parameters of the user from a plurality of human body simulation models according to the body shape parameters of the user, and transmit the body shape parameters of the user to a selected human body simulation model. The human body simulation model included in this embodiment may be any of the human body simulation models in above embodiments, which will not be described in detail here.

According to an embodiment, the human body simulation model may comprise a plurality of model numbers, for example, five model numbers comprising XS, S, M, L, and XL. The processor receives the body shape parameters of the user and selects an appropriate human body simulation model from a plurality of human body simulation models with different model numbers according to the body shape parameters of the user, and transmits the body shape parameters of the user to the selected human body simulation model. In this way, convenient fitting services may be further provided, and user experience of a buyer and a seller may be effectively improved.

Figure 7:
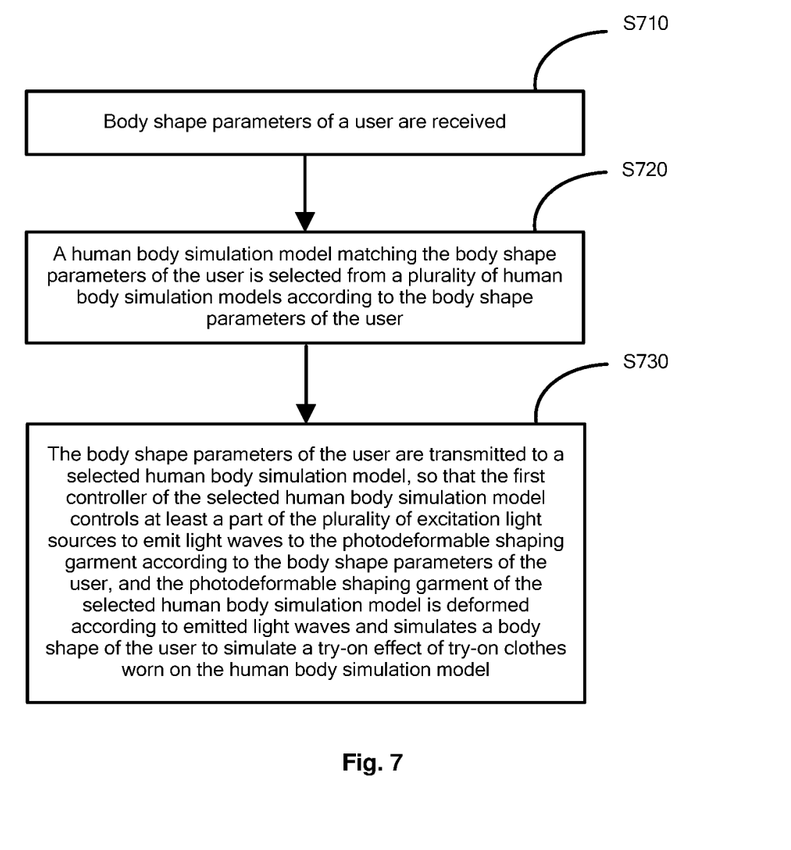
FIG. 7 illustrates a flowchart of a control method according to another embodiment of the present disclosure.

In correspondence with the fitting server according to above embodiment, the embodiments of the present application further provide a control method of the fitting server described above. FIG. 7 illustrates a flowchart of the control method according to another embodiment of the present disclosure.

As illustrated in FIG. 7, the control method of the fitting server according to the embodiment of the present application comprises the following steps.

In step S710, body shape parameters of a user are received.

In step S720, a human body simulation model matching the body shape parameters of the user is selected from a plurality of human body simulation models according to the body shape parameters of the user.

In step S730, the body shape parameters of the user are transmitted to a selected human body simulation model, so that the first controller of the selected human body simulation model controls at least a part of the plurality of excitation light sources to emit light waves to the photodeformable shaping garment according to the body shape parameters of the user, and the photodeformable shaping garment of the selected human body simulation model is deformed according to emitted light waves and simulates a body shape of the user to simulate a try-on effect of try-on clothes worn on the human body simulation model.

Figure 8:
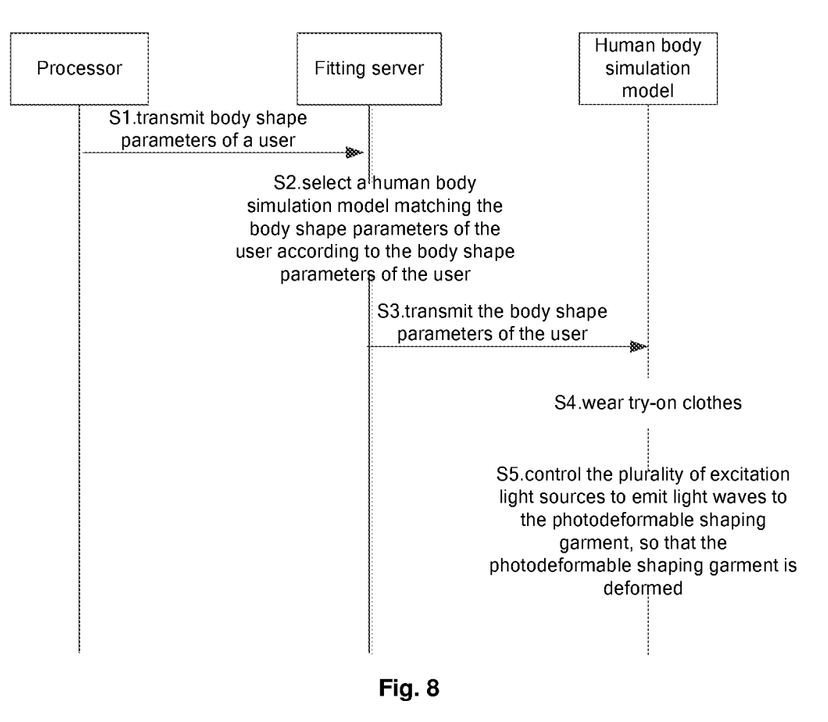
FIG. 8 illustrates a schematic diagram of a control method according to another embodiment of the present disclosure.

FIG. 8 illustrates a schematic diagram of a control method according to this embodiment. As illustrated in FIG. 8, the control method is performed according to the following steps.

In S1, the processor of the fitting device transmits body shape parameters of a user to the fitting server, for example, in response to an operation of the user.

In this embodiment, the processor of the fitting device may be, for example, a smart phone device. The user inputs the body shape parameters of the user through an application running on the smart phone, and the smart phone transmits the body shape parameters of the user to the fitting server.

In S2, the fitting server selects a human body simulation model matching the body shape parameters of the user according to the body shape parameters of the user.

In S3, the fitting server transmits the body shape parameters of the user to a selected human body simulation model.

In this embodiment, the human body simulation model comprises a plurality of model numbers, for example, five model numbers comprising XS, S, M, L, and XL. The fitting server receives the body shape parameters of the user, and selects an appropriate human body simulation model according to parameters such as a waist circumference, a chest circumference, a buttocks circumference, a shoulder width, a clothing length, etc., among the body shape parameters of the user. For example, a human body simulation model having a model number of L is selected according to the body shape parameters of the user, and the body shape parameters of the user are transmitted to the selected human body simulation model having the model number of L. Here, the human body simulation model which matches the body shape parameters of the user is selected by the fitting server. For example, an human body simulation model having a model number of L may be used to simulate a user having a waist circumference of 2.2 feet to 2.4 feet, and a human body simulation model having a model number of XL may be used to simulate a user having a waist circumference of 2.4 feet to 2.6 feet, so that it is convenient for a buyer and a seller to simulate a body shape of the user through a human body simulation model which is closer to the body shape parameters of the user to try on clothes.

In S4, try-on clothes is worn on the human body simulation model.

In this embodiment, the try-on clothes selected by the user is worn on the selected human body simulation model.

In S5, the first controller of the human body simulation model controls at least a part of the plurality of excitation light sources to emit light waves to the photodeformable shaping garment according to the body shape parameters of the user, and the photodeformable shaping garment is deformed and simulates the body shape of the user to simulate a try-on effect of the try-on clothes.

In this embodiment, the human body simulation model emits light waves to the photodeformable shaping garment through the plurality of excitation light sources, and the photodeformable shaping garment is deformed to obtain a simulated body shape of the user, thereby simulating an effect of the user wearing the try-on clothes. This realizes the use of the human body simulation model to assist the user to try on clothes.

The embodiments of the present disclosure propose a human body simulation model, a fitting device comprising the human body simulation model, a fitting server and a control method, which simulate different body shapes of users through the human body simulation model to solve the problem that it is impossible to try on clothes during online shopping, and have a wide range of application prospects.

Obviously, above embodiments of the present disclosure are merely examples to clearly illustrate the present disclosure, and are not intended to limit the implementations of the present disclosure. On the basis of the above description, those of ordinary skill in the art may further make other different types of variations or changes. It is not possible to enumerate all the implementations here, and any obvious variations or changes derived from the technical solutions of the present disclosure are still within the protection scope of the present disclosure.

We claim:

1. A human body simulation model, comprising:
   a human body model;
   a photodeformable shaping garment disposed on the human body model;
   a plurality of excitation light sources distributed on the human body model, and configured to emit light waves to the photodeformable shaping garment;
   a plurality of elastic elements distributed on a side of the human body model facing the photodeformable shaping garment, and configured to be adaptively deformed in response to pressure generated due to deformation of the photodeformable shaping garment to support the photodeformable shaping garment;
   a first controller connected to the plurality of excitation light sources, and configured to receive body shape parameters of a user and control at least a part of the plurality of excitation light sources to emit light waves to the photodeformable shaping garment according to the body shape parameters of the user, so that the photodeformable shaping garment is deformed to simulate a body shape of the user;
   a plurality of pressure sensors distributed on the photodeformable shaping garment, disposed on a side of the photodeformable shaping garment away from the human body model, and configured to sense pressure of try-on clothes worn on the human body simulation model onto the human body simulation model and output pressure signals;
   a second controller configured to generate pressure information for display according to the pressure signals output by the plurality of pressure sensors;
   a display panel connected to the first controller and the second controller, and configured to display the body shape parameters of the user under control of the first controller and display the pressure information under control of the second controller; and
   a display panel connected to the first controller and the second controller, and configured to display the body shape parameters of the user under control of the first controller and display the pressure information under control of the second controller.

2. The human body simulation model according to claim 1, wherein
   the plurality of excitation light sources and the plurality of elastic elements are evenly distributed on predetermined parts of the human body model; and
   the plurality of pressure sensors are evenly distributed in a predetermined area of the photodeformable shaping garment, wherein the predetermined area covers the predetermined parts of the human body model.

3. The human body simulation model according to claim 2, wherein the predetermined parts comprise at least one of a chest, shoulders, a waist, or buttocks.

4. The human body simulation model according to claim 1, wherein
   a material of the photodeformable shaping garment is a liquid crystal polymer comprising azobenzene units.

5. The human body simulation model according to claim 1, wherein
   the photodeformable shaping garment has a thickness more than 0.1 mm and less than 2 mm.

6. The human body simulation model according to claim 1, wherein
   the elastic elements are compression springs.

7. The human body simulation model according to claim 1, wherein
   the excitation light sources are solid ultraviolet lasers, gas ultraviolet lasers or semiconductor laser diodes.

8. The human body simulation model according to claim 1, wherein the body shape parameters of the user comprise at least one of a shoulders width, a chest circumference, a waist circumference, a buttocks circumference, a sleeve length, a pants length, or a crotch length of the user.

9. A fitting device, comprising:
   a human body simulation model according to claim 1; and
   a processor configured to receive body shape parameters of a user and transmit the body shape parameters of the user to the human body simulation model, so that a first controller of the human body simulation model controls at least a part of a plurality of excitation light sources to emit light waves to a photodeformable shaping garment according to the body shape parameters of the user, so that the photodeformable shaping garment is deformed to simulate a body shape of the user.

10. A control method of the human body simulation model according to claim 1, comprising:
    receiving, by a first controller of the human body simulation model, body shape parameters of a user and controlling at least a part of a plurality of excitation light sources to emit light waves to a photodeformable shaping garment according to the body shape parameters of the user; and causing the photodeformable shaping garment of the human body simulation model to be deformed according to emitted light waves to simulate a body shape of the user, so as to simulate a try-on effect of try-on clothes worn on the human body simulation model.

11. The control method according to claim 10, further comprising:

sensing, by a plurality of pressure sensors of the human body simulation model, pressure of the try-on clothes worn on the human body simulation model onto the human body simulation model and outputting pressure signals; and generating, by a second controller of the human body simulation model, pressure information for display according to the pressure signals output by the plurality of pressure sensors.

12. A fitting server, comprising:

a memory having instructions stored therein; and a processor configured to execute the instructions to receive body shape parameters of a user, select a human body simulation model matching the body shape parameters of the user from a plurality of human body simulation models according to the body shape parameters of the user, and transmit the body shape parameters of the user to a selected human body simulation model, wherein the human body simulation model comprises:
a human body model;
a photodeformable shaping garment disposed on the human body model;
a plurality of excitation light sources distributed on the human body model, and configured to emit light waves to the photodeformable shaping garment;
a plurality of elastic elements distributed on a side of the human body model facing the photodeformable shaping garment, and configured to be adaptively deformed in response to pressure generated due to deformation of the photodeformable shaping garment to support the photodeformable shaping garment; and
a first controller connected to the plurality of excitation light sources, and configured to receive the body shape parameters of the user and control at least a part of the plurality of excitation light sources to emit light waves to the photodeformable shaping garment according to the body shape parameters of the user, so that the photodeformable shaping garment is deformed to simulate a body shape of the user;
a plurality of pressure sensors distributed on the photodeformable shaping garment, disposed on a side of the photodeformable shaping garment away from the human body model, and configured to sense pressure of try-on clothes worn on the human body simulation model onto the human body simulation model and output pressure signals;
a second controller configured to generate pressure information for display according to the pressure signals output by the plurality of pressure sensors;
a display panel connected to the first controller and the second controller, and configured to display the body shape parameters of the user under control of the first controller and display the pressure information under control of the second controller; and
a display panel connected to the first controller and the second controller, and configured to display the body shape parameters of the user under control of the first controller and display the pressure information under control of the second controller.

13. A control method of the fitting server according to claim 12, comprising:

receiving body shape parameters of a user;

selecting a human body simulation model matching the body shape parameters of the user from a plurality of human body simulation models according to the body shape parameters of the user;

transmitting the body shape parameters of the user to a selected human body simulation model, so that a first controller of the selected human body simulation model controls at least a part of a plurality of excitation light sources to emit light waves to a photodeformable shaping garment according to the body shape parameters of the user, and the photodeformable shaping garment of the selected human body simulation model is deformed according to emitted light waves and simulates a body shape of the user to simulate a try-on effect of try-on clothes worn on the human body simulation model.

* * * * *